Jan. 3, 1956 C. M. PERKINS 2,729,772
SERVO SYSTEM CONTROLLED BY ELECTRICAL SIGNALS
Filed Feb. 20, 1951
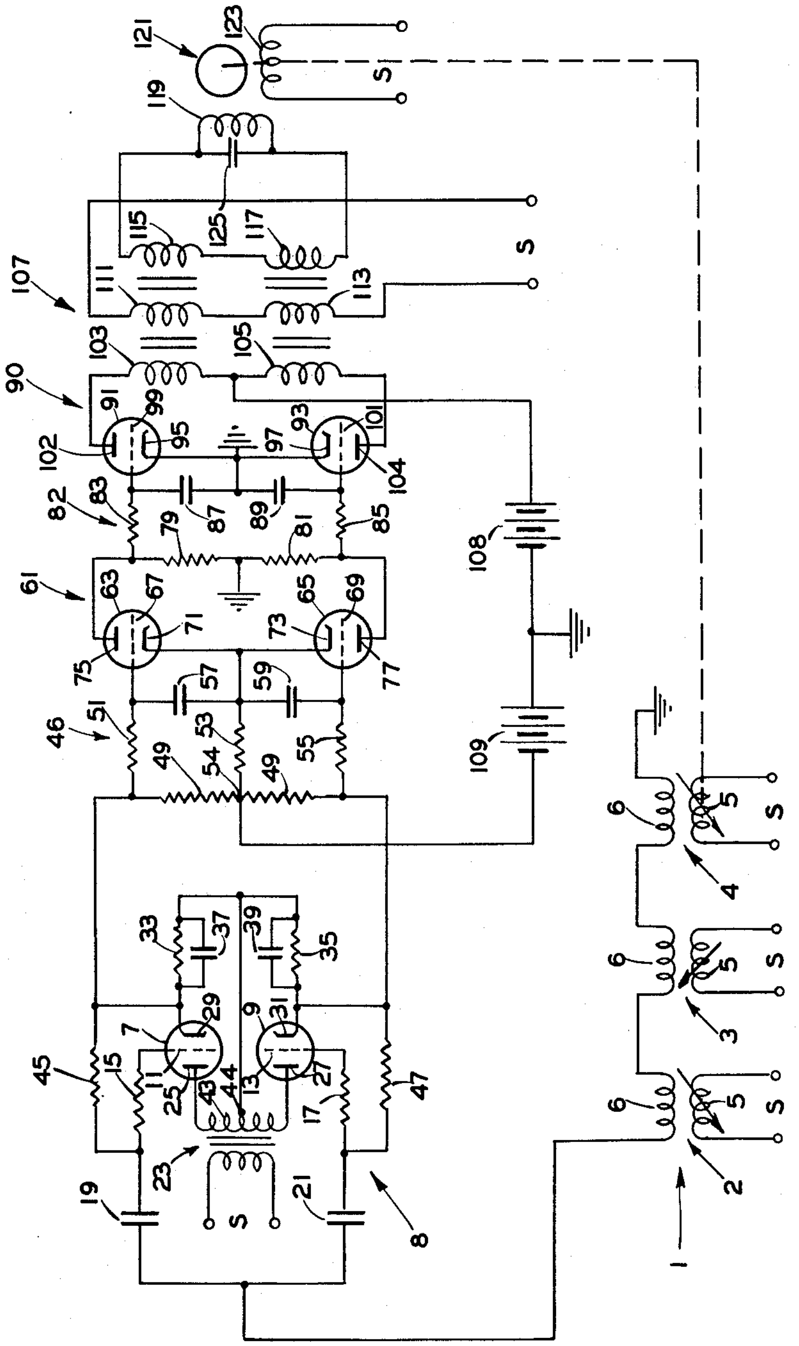
INVENTOR.
CORLES M. PERKINS
BY [signature]
- ATTORNEY -

United States Patent Office 2,729,772

Patented Jan. 3, 1956

2,729,772

SERVO SYSTEM CONTROLLED BY ELECTRICAL SIGNALS

Corles M. Perkins, Minneapolis, Minn., assignor to Bendix Aviation Corporation, Teterboro, N. J., a corporation of Delaware Application February 20, 1951, Serial No. 211,960

4 Claims. (Cl. 318—28)

The invention relates to servo systems and more particularly to a servo system of the kind generally shown and described in co-pending application Serial No. 36,736, filed July 2, 1948, by Corles M. Perkins, Sr., and Alan M. MacCallum and now matured into Patent No. 2,676,291 issued April 20, 1954.

In servo systems including an amplifier and servomotor responding to control signals developed by a signal generator at a remote point, the amplifier must determine the phase of a small alternating control signal and produce an output corresponding to the signal and of sufficient magnitude to operate the servomotor. The signal generator may include a plurality of inductive devices responsive to changing conditions and connected so as to add algebraically the voltages induced therein. If the voltages induced in the inductive devices are not of the same or opposite phase, the signal generator, in addition to developing useful control signals, may develop spurious voltages 90 degrees out of phase with the control signals and of considerably greater amplitude than the control signals.

In the amplifier of the above application, the signals from the signal generator are applied to a preamplifier and the preamplified signals are fed to a discriminator to determine their phase. With this arrangement, spurious voltages are amplified with the signals. The preamplifier gain is chosen so that the discriminator saturates and delivers full output with larger signal voltages. Although the amplifier may reject spurious voltages, by operating the discriminator at saturation, sensitivity of the amplifier is decreased.

One object of the present invention is to provide an amplifier which effectively rejects the spurious voltages and amplifies the control signals to provide corresponding voltages of sufficient power to operate the servomotor.

Another object is to operate the discriminator below saturation to increase the sensitivity of the amplifier.

Another object is to apply the control signal together with spurious voltages developed by the signal generator directly to the discriminator without first amplifying the output of the signal generator so that saturating plate currents will not flow in the discrimnator for normal control signals.

The invention contemplates a servo system including a discriminator connected directly to a signal generator to receive signal voltages therefrom and operate below saturation. An amplifier is connected to the discriminator and receives and amplifies the output of the discriminator and driving means is connected to the amplifier and is responsive to its output.

The foregoing and other objects and advantages of the invention will appear more fully hereinafter from a consideration of the detailed description which follows taken together with the accompanying drawing wherein one embodiment of the invention is illustrated. It is to be expressly understood, however, that the drawing is for purposes of illustration and description only and is not to be construed as defining the limits of the invention.

The single figure of the drawing is a schematic diagram showing a servo system including an amplifier constructed according to the invention.

Referring now to the drawing for a more detailed description of the novel servo system of the present invention, the servo system is shown in the drawing as including a signal generator 1 including a plurality of inductive devices 2, 3, 4, each having a rotor 5 energized by an alternating power source S and a stator 6 adapted to have induced therein signals corresponding to the positions of rotor 5 relative to the stator. The stators are connected in series to add algebraically the voltages induced therein, and, as explained above, if the voltages induced in the inductive devices are not of the same or opposite phase, undesirable spurious voltages may develop in addition to the usable signals.

The output of signal generator 1 is applied to a discriminator 8, generally of the kind shown and described in the above application, operated below saturation for normal output of the signal generator. The discriminator effectively rejects the spurious voltages and determines the phase of the control signals.

The discriminator comprises a pair of triode tubes 7, 9 having their grids 11, 13 connected through resistors 15, 17 and coupling condensers 19, 21, respectively, to the stator windings 6 of the signal generator. A transformer 23, energized by alternating power source S, has a center-tapped secondary winding 43 connected to plates 25, 27 of tubes 7, 9, respectively, and provides suitable plate potential for the tubes. Cathodes 29, 31 of tubes 7, 9, respectively, are connected through bais resistors 33, 35 and by-pass condensers 37, 39 in parallel therewith to the center-tap 44 of secondary winding 43 of transformer 23. Grid resistors 45, 47 cooperate with resistors 15, 17 to connect grids 11, 13 to cathodes 29, 31, respectively. Resistors 15, 45 and 17, 47 preferably are of such value that tubes 7, 9 operate at substantially zero grid bias in the absence of control signals. Under these conditions equal plate current flows in cathode resistors 33, 35 and both cathodes 29, 31 of tubes 7, 9 are at equal potential and positive relative to center-tap 44 of secondary winding 43 of transformer 23.

The potential appearing across the cathodes 29, 31 of tubes 7, 9 is applied to a filter 46 including resistors 51, 55 connected to the ends of a resistor 49, and a resistor 53 connected to a center-tap 54 of resistor 49. A condenser 57 is connected between resistors 51, 53 and a condenser 59 is connected between resistors 53, 55.

The output of the filter is applied to a voltage amplifier 61 including a pair of triodes 63, 65 having grids 67, 69 connected to resistors 51, 55 and condensers 57, 59, respectively, and cathodes 71, 73 connected together and to resistor 53 and to condensers 57, 59. Plates 75, 77 of triodes 63, 65 are connected through resistors 79, 81, respectively, to ground. Resistors 49 and resistors 51, 53, 55 effectively isolate center-tap 44 of secondary winding 43 of transformer 23 from ground and from cathodes 71, 73 of tubes 63, 65 so that the difference in cathode voltages of tubes 7, 9 corresponds to the phase and amplitude of the signal from signal generator 1.

The output of voltage amplifier 61 is applied to a filter 82 including resistors 79, 81, resistors 83, 85 and condensers 87, 89.

The output of filter 82 is applied to a power amplifier 90 including a pair of tubes 91, 93 having cathodes 95, 97 connected to ground and to a point between condensers 87, 89. Grids 99, 101 of tubes 91, 93 are connected to resistors 83, 85 and condensers 87, 89, respectively. The plates 102, 104 of tubes 91, 93 are connected to saturating windings 103, 105 of a magnetic amplifier 107. A B+ supply 108 is connected to saturating windings 103, 105 and a "C" biasing battery 109 is connected to the center-tap 54 of resistor 49. Each saturating winding 103, 105 is wrapped on a separate core with a primary winding 111, 113 and a secondary winding 115, 117, respectively. Primary windings 111, 113 are connected in series aiding relation to source S and secondary windings 115, 117 are connected in series opposition to the field winding 119 of a two-phase motor 121 drivably connected to the rotor of inductive device 4 to provide a follow-up signal. A phasing condenser 125 is connected across field winding 119. The other winding 123 of motor 121 is separately excited by alternating current source S.

Tubes 7, 9 operate at substantially zero grid bias with no output from signal generator 1, and equal plate currents flow in cathode resistors 33, 35 so that cathodes 29, 31 are at equal potential and are positive relative to center-tap 44 of secondary winding 43 of transformer 23. Under these conditions, grids 67, 69 of tubes 63, 65 are at the same potential and equal plate currents flow through these tubes. Tubes 63, 65 preferably are operated at low grid bias to provide for large plate current flow through the tubes.

Plate currents from tubes 63, 65 produce voltage drops across resistors 79, 81 with plates 75, 77 negative relative to ground. The plate potentials of tubes 63, 65 are applied to grids 99, 101 of tubes 91, 93 and the static current through resistors 79, 81 provides tubes 91, 93 with grid bias preferably sufficient to cut off plate current flow through the tubes. This, however, is not necessary as any suitable grid bias may be used.

The output of signal generator 1 comprises usable signals in phase with the plate potential of one tube 7 or 9 and 180 degrees out of phase with the plate potential of the other tube, and spurious voltages approximately 90 degrees out of phase with the signals. The output of signal generator 1 is applied directly to the discriminator and the magnitude of the normal output of the signal generator is such that the discriminator will not be saturated.

When the signal from signal generator 1 is in phase with the plate potential of tube 7, plate current flow in tube 7 increases and plate current flow in tube 9 decreases. The voltage drop across resistor 33 increases and the voltage drop across resistor 35 decreases, and cathodes 29, 31 are at different potentials. The potential difference between the cathodes is applied to grids 67, 69 of tubes 63, 65 and grid 67 of tube 63 becomes more positive and grid 69 of tube 65 becomes more negative. The spurious voltages change the potentials of cathodes 29, 31 substantially equally and do not appear at grids 67, 69 of tubes 63, 65.

Plate current flow in tube 63 increases and plate 75 of tube 63 becomes more negative and plate current flow in tube 65 decreases, and plate 77 of tube 65 becomes less negative, and the potentials of grids 99, 101 of tubes 91, 93 change accordingly. If the signal from signal generator 1 is of sufficient magnitude, plate current flow in tube 65 may be cut off. Since plate current in tube 91 is already cut off, its more negative grid 99 produces no change in grid current, but the plate current of tube 93 increases as its grid 101 becomes more positive, and this comprises the useful output of the amplifier. Plate current saturation of tubes 63, 65 and tubes 91, 93 may occur with large signal amplitudes.

When a signal of opposite phase is applied to the input of the discriminator, plate current flow in tube 91 provides the useful output of the amplifier.

In a laboratory test, the amplifier was adjusted to saturate with 150 millivolts of signal in phase with the plate potential of tube 7 or 9, and sensitivity of the amplifier was not affected by applying as much as 6 volts of spurious voltages 90 degrees out of phase with the signal and without affecting the output of the amplifier. This represents an extremely severe operating condition.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A device for amplifying the usable signals and rejecting the spurious signals of a signal source which develops signal voltages in response to a change in a condition to be measured, comprising a discriminator stage and an amplifier stage, said discriminator stage having a pair of electron tubes each having a grid adapted to receive directly said signal voltages including usable signals and spurious voltages substantially ninety degrees out of phase with the signals, said signal voltages being of a magnitude to operate the discriminator below saturating plate currents, and said amplifier stage receiving the output of said discriminator, said discriminator including means to substantially balance out the spurious voltages so that the input to the amplifier stage corresponds to the usable signal whereby the usable signal is amplified in the amplifier stage and not the spurious signal voltage.

2. A servosystem comprising a driving means, a signal source adapted to develop alternating voltage signals including usable signals and spurious voltages approximately ninety degrees out of phase with the signals, and means connecting said signal source and driving means for the operation of the latter by said signals including a discriminator connected directly to said signal source and having a pair of electron tubes each including a plate, a cathode and a control grid, said control grids being arranged to receive the signal voltages and said plates being energized by alternating potentials of opposite phase, said signal being in phase with one of the plate potentials and being one hundred eighty degrees out of phase with the other plate potential, said usable signals and spurious voltages being of a low magnitude so as to operate the discriminator below saturation, and said discriminator including means for blocking the spurious voltages and for converting the usable signals to D. C. voltages corresponding to the signals, an amplifier connected with said discriminator and responsive to the D. C. voltages for amplifying the magnitude of said usable signals, said driving means being connected to said amplifier and responsive to the output of the latter.

3. In a servosystem, a pair of thermionic tubes constituting a discriminator, each tube having a control grid, a cathode and a plate, a signal developing device adapted to develop alternating signal voltages including usable signals and spurious voltages approximately ninety degrees out of phase with the signals, means connecting said signal source directly to said control grid whereby said signal voltages operate said tubes below saturation, a transformer having a center-tapped winding with its ends connected to said plates and its center-tap connected to said cathode, amplifying means including a pair of electron tubes each having a cathode and a grid adapted to receive the difference in cathode potentials, and means for isolating the center-tap of said transformer winding from the cathodes of said amplifier.

4. A servosystem comprising a servomotor, an inductive device for developing a signal for said servomotor, said signal including usable component and a spurious component, and means connecting said inductive device and said servomotor including a discriminator connected directly to said inductive device and having a pair of electron tubes, each tube including a plate, a cathode and a control grid, said control grids being arranged to receive the signal voltages and said plates being energized by alternating potentials of opposite phase, said signal being in phase with one of the plate potentials and being one hundred eighty degrees out of phase with the other plate potential, said signal voltages being of a magnitude to operate the discriminator below saturation, and said discriminator including means for blocking the spurious voltages and for converting the usable signals to D. C. voltages corresponding to said usable signals, an amplifier including a normally balanced magnetic amplifier connected with said discriminator and responsive to said D. C. voltages and unbalanced thereby to develop an output, said servomotor being connected to said amplifier and responsive to the output of the latter.

References Cited in the file of this patent

UNITED STATES PATENTS

| | | |
|---|---|---|
| 2,363,342 | Lesnick | Nov. 21, 1944 |
| 2,432,422 | Hornfeck | Dec. 9, 1947 |
| 2,528,054 | Harrison | Oct. 31, 1950 |

OTHER REFERENCES

Electronic Instrument, Greenwood, Holden, McRae, McGraw-Hill, New York, 1948, p. 384, Figs. 12–14.